(12) United States Patent  
Lesur

(10) Patent No.: US 9,392,139 B2
(45) Date of Patent: Jul. 12, 2016

(54) METHOD FOR PRINTING A COLOUR PIXEL MATRIX ON A PHYSICAL MEDIUM BY PRINTING OBLIQUE LINES AND ASSOCIATED CONTROL DEVICE

(71) Applicant: GEMALTO S.A., Meudon (FR)

(72) Inventor: Jean-Luc Lesur, Meudon (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 14/410,444

(22) PCT Filed: Jun. 21, 2013

(86) PCT No.: PCT/EP2013/063064
§ 371 (c)(1),
(2) Date: Dec. 22, 2014

(87) PCT Pub. No.: WO2013/190122
PCT Pub. Date: Dec. 27, 2013

(65) Prior Publication Data
US 2015/0373226 A1    Dec. 24, 2015

(30) Foreign Application Priority Data

Jun. 22, 2012 (EP) .................................... 12004716

(51) Int. Cl.
| H04N 1/40 | (2006.01) |
| H04N 1/52 | (2006.01) |
| H04N 1/405 | (2006.01) |
| B41J 2/21 | (2006.01) |

(52) U.S. Cl.
CPC . *H04N 1/405* (2013.01); *B41J 2/21* (2013.01); *H04N 1/4058* (2013.01); *H04N 1/52* (2013.01)

(58) Field of Classification Search
None
See application file for complete search history.

(56) References Cited

U.S. PATENT DOCUMENTS

| 4,805,033 A | 2/1989 | Nishikawa |
| 6,027,202 A | 2/2000 | Narushima |
| 2005/0200900 A1 | 9/2005 | Hirano |
| 2011/0090298 A1 | 4/2011 | Bombay et al. |

OTHER PUBLICATIONS

PCT/EP2013/063064, International Search Report, Oct. 11, 2013, European Patent Office, P.B. 5818 Patentlaan 2 NL—2280 HV Rijswijk.

*Primary Examiner* — Scott A Rogers
(74) *Attorney, Agent, or Firm* — The Jansson Firm Pehr Jansson

(57) ABSTRACT

A method designed to allow the printing of a matrix (MPC) of pixels, in N colours defining a colour coding system, on a selected part of a physical medium (MP). That method comprises a stage in which colour pixels are printed in at least one pass along oblique lines in relation to the physical medium (MP), wherein the pixels of an oblique line are all in the same colour selected from the N colours and different from that used for the previous oblique line, in order to generate a matrix (MPC) of M horizontal lines comprising P pixels each in the N colours successively in a selected order, and wherein each horizontal line other than the first one comprises a first pixel that is identical to the second pixel of the previous horizontal line.

11 Claims, 2 Drawing Sheets

METHOD FOR PRINTING A COLOUR PIXEL MATRIX ON A PHYSICAL MEDIUM BY PRINTING OBLIQUE LINES AND ASSOCIATED CONTROL DEVICE

FIELD OF THE INVENTION

The invention relates to the field of printing, more precisely the printing of pixel matrices on physical media.

A 'physical medium' is any type of medium on which a pixel matrix can at least be printed, possibly with the purpose of allowing subsequent personalisation. It may therefore be a sheet or card made of plastic or synthetic material, or cardboard, or paper Besides, 'personalisation' means adding to a physical medium alphanumeric signs and/or a reproduction of a photograph and/or other graphics elements so that it (they) may make up one or more distinctive signs

BACKGROUND OF THE INVENTION

As any person of the art would know, a proposition has been made, particularly through the patent document WO 2011/045180, to define on a selected part of a physical medium, such as for example a plastic substrate, a matrix of M*P pixels in N colours (possibly primary colours) defining a colour coding system.

A 'colour coding system' is a set of N colours (possibly primary colours) that make it possible to define any visible colour when they are combined with each other. As non-limitative examples, the system may be the so-called RGB (Red, Green, Blue) system or the so-called YMC (Yellow, Magenta, Cyan) system or the so-called YMCRGB (Yellow, Magenta, Cyan, Red, Green, Blue) system.

The matrix comprises M 'horizontal' lines comprising P pixels each in the N colours (possibly primary colours) successively according to a selected order (for example Red (R) then Green (G) then Blue (B)), with the possible repetition of that order when P is greater than N (for example R G B R G B R G B). Besides, each horizontal line other than the first one comprises a first pixel with a colour identical to that of the second pixel of the previous line. That is what is called a line shift matrix.

This type of matrix constitutes a diagram or a chart that is designed to contribute to the definition of an image in colour, for example a face. In fact, when the matrix has been printed on the physical medium, for example by the ink jet method, a first transparent light-sensitive layer (for example in doped polycarbonate) may be deposited over it, wherein said layer is capable of being modified selectively by a first laser (for example of the 355 nm UV type or 532 nm green UV type) to become locally opaque white at predefined locations, then, on top of the first transparent light-sensitive layer, a second transparent light-sensitive layer (for example in carbon-doped polycarbonate) may be deposited over it, wherein said layer is capable of being modified selectively by a second laser (for example of the 1064 nm Nd-YAG type) to become locally opaque black (or in shades of grey) at predefined locations. After that, at least one exposure mask is generated from the digital data file that defines the image used for personalising the physical medium, then each exposure mask is placed very precisely on top of the second opaque light-sensitive layer and the whole is exposed successively to the light supplied by the first laser and then to the light supplied by the second laser in order to generate a reproduction of the image on the physical medium. A galvanometric scan head system may equally and advantageously be used, to distribute all the laser pulses to different positions that correspond with the locations where the mask or masks must let through the light supplied by the lasers.

One of the drawbacks of that method lies in the embodiment of the pixel matrix. That is because the pixel matrix can be made by print heads of different colours that are not located in the same position on the path of the support, leading to slight errors in the positioning of the pixels in relation to each other because of their different ink combinations to define the different colours that need to managed pixel by pixel. These errors are generally the result of the alignment of the print heads and/or the relative non-constant speed of the support under the print heads and/or the mechanical play in the transport of the support and/or the speed of ejection of ink drops in the case of an ink jet printing system (purely for information and thus not limitative). Now, these positioning errors can lead to the partial superposing of neighbouring pixels in different colours and therefore uniformity defects of the N colours (possibly primary colours) over the entire matrix.

Besides, because of these positioning errors of the colour pixels in the matrix, the pixels in different shades of grey and the white pixels (or transparent pixels) that are generated during the stage of modification in the first and second light-sensitive layers respectively on top of the corresponding colour pixels are also not correctly positioned on the latter, which leads to local intensity and/or colour and/or shade errors in the reproduced image, which degrade the perceived quality by giving rise to a moiré effect or other colorimetric effects. That degradation is all the more intense because the stages of generation of pixels in different shades of grey and transparent pixels are also carried out one horizontal line after another by the horizontal and then vertical displacement of the modification means (laser) in relation to the physical medium, and thus give rise to slight positioning errors, but which may not exceed 20% of the size of the colour pixels in order to limit the degradation of the quality of the image produced.

SUMMARY OF THE INVENTION

The invention is thus aimed at improving the situation.

To that end, it particularly proposes a method designed to allow the printing of a matrix of M*P pixels, in N colours defining a colour coding system, on a selected part of a physical medium.

This method is characterised by the fact that it comprises a stage in which colour pixels are printed in at least one pass on the selected part along oblique lines in relation to the physical medium, wherein the pixels of an oblique line are all in the same colour selected from the N colours and different from that used for the previous oblique line, in order to generate a matrix of M horizontal lines comprising P pixels each in the N colours successively in a selected order, with the possible repetition of that order when P is greater than N, and wherein each horizontal line other than the first one comprises a first pixel that is identical to the second pixel of the previous horizontal line.

The method according to the invention may comprise other characteristics that may be taken separately or combined with each other, particularly:

a preliminary stage may be included wherein the physical medium is turned by a selected angle so as to make up the matrix along oblique lines slanted to the selected angle, where all the pixels in each of them are in the same colour;

printing may be carried out using the ink jet or offset processes;

the colour coding system may be selected from (at least) the Red, Blue Green system, the Yellow, Magenta, Cyan system and a combination of the two previous systems;

the colour coding system may be selected from a group comprising several colours relating to the required colour space.

The invention also proposes a device devoted to controlling a printing system for printing a matrix of M*P pixels in N colours defining a colour coding system on a selected part of a physical medium.

That device is characterised by the fact that it is organised to order the printing system to print colour pixels in at least one pass on that selected part along oblique lines in relation to the physical medium, wherein the pixels of an oblique line are all in the same colour selected from the N colours, different from that used for the previous oblique line, in order to generate a matrix of M horizontal lines comprising P pixels each in the N colours successively in a selected order, with the possible repetition of that order when P is greater than N, and wherein each horizontal line other than the first one comprises a first pixel that is identical to the second pixel of the previous horizontal line.

The invention also proposes a printing system capable of printing a diagram of pixels in N colours defining a colour coding system on a selected part of a physical medium and comprising a control device of the type presented above.

The printing system according to the invention may comprise other characteristics that may be taken separately or in combination, particularly:

- it may comprise supporting means that are capable of receiving the physical medium in a position turned by a selected angle, so that the matrix is made up along oblique lines slanted to the selected angle (in relation to the support), where all the pixels in each of them are in the same colour;
- it may comprise printing means organised to print the matrices using the ink jet or offset processes;
- the colour coding system may be selected from (at least) the Red, Blue Green system, the Yellow, Magenta, Cyan system and a combination of the two previous systems;
- it may comprise modification means organised to laser print pixels in different shades of grey or black pixels or white pixels or pixels in determined colours or transparent pixels in light-sensitive layers of the physical medium that are placed on top of the matrix, corresponding with the colour pixels of the matrix respectively.

BRIEF DESCRIPTION OF DRAWINGS

Other characteristics and benefits of the invention will become clear in the detailed description below, by reference to the attached figures, wherein.

DETAILED DESCRIPTION

The invention particularly aims to propose a method, and an associated control device D, designed to allow the printing of a pixel matrix MPC with pixels in N colours defining a colour coding system on a selected part PC of a physical medium MP.

In what follows, it is considered as a non-limitative example that the physical medium MP is a card made of plastic (or synthetic) material designed to be personalised, such as for example an identification card or a badge. But the invention is not limited to that type of physical medium. Indeed, it relates to any type of medium on which a pixel matrix can at least be printed, possibly with the purpose of allowing subsequent personalisation. It may thus be a sheet or a card made of plastic or synthetic material, or cardboard, or paper, and generally any other type of medium that will accept several sensitive layers designed to allow the making of a pixel matrix (or chart).

Besides, it is considered in the text below, as a non-limitative example, that personalisation consists at least in printing a colour reproduction of a colour photograph of a face, defined by a data file (for example of the BMP type). But the invention is not limited to that type of personalisation. Indeed, it relates to all types of personalisation consisting in printing on a physical medium MP alphanumeric signs and/or a reproduction of a photograph and/or other graphics elements so that it(they) may make up one or more distinctive signs.

Figure 1:
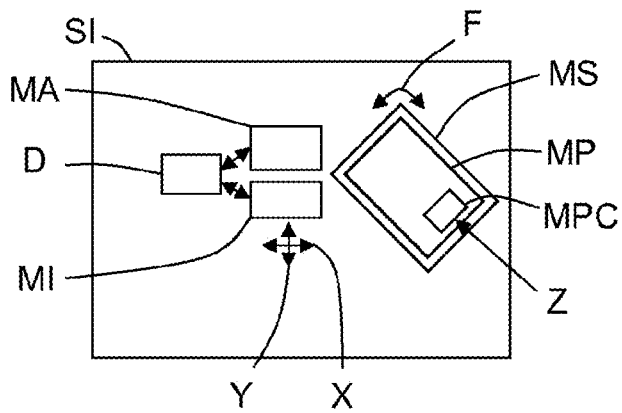
FIG. 1 is a schematic and functional illustration of an example of the printing system with a control device according to the invention.

FIG. 1 contains a schematic illustration of an example of a printing system SI designed to allow at least the printing of a matrix of M*P pixels in N colours defining a colour coding system on a selected part PC of a physical medium MP (here a plastic card). M here designates the number of horizontal lines of the matrix MPC, whereas P here designates the number of colour pixels (and thus the number of 'vertical' columns) of that same matrix MPC.

In what follows, it is considered as a non-limitative example that the colour coding system is the so-called YMC (Yellow, Magenta, Cyan) system. That means that N=3. But the invention is not limited to that type of colour coding system.

Indeed, it concerns any set of N colours that make it possible to define any visible colour when they are combined with each other. Thus, it may be a so-called RGB (Red, Green, Blue) system or a combination of the two aforementioned systems (YMC and RGB) or a combination of colours that makes it possible to cover the required colour space.

That printing system SI comprises at least supporting means MS, printing means MI and a control device D according to the invention.

The supporting means MS are organised so as to narrowly hold the physical medium MP so that it can be positioned in a selected position. For a reason that will be explained below, it is preferable for the supporting means MS to be able to be made to rotate in a controlled manner so as to allow the placing of the physical medium MP in a position that is turned by a selected angle (for example 45°, on a non-limitative basis) in relation to the printing means MI.

The printing means MI are organised to print the pixels of the matrix MPC. Preferably, printing is carried out using the ink jet process. Those printing means MI are made integral with movement means (not illustrated) that are capable of displacing them along two selected directions, X and Y, perpendicular to each other. The direction X here is the direction of the (M+P−1) oblique lines Lj (where j=1 to M+P−1) of the matrix MPC, whereas the direction Y here is the direction of displacement that makes it possible to move from one oblique line Lj to another oblique line Lj' (where j'=j+1).

An 'oblique line' is a straight line that is slanted by 45° in relation to a horizontal line of a matrix MPC, which begins on one side of the matrix MPC and ends on the other side of that matrix MPC, perpendicular to the side of the start of the line.

The control device D is designed to control the movements of the means for moving the printing means MI. For example, it may take the form of a calculator that is part of a computer (or the like) or the form of a computer (or the like) or the form of a software module installed in a computer (or the like). As a result, it may be made in the form of software modules (software) or a combination of electronic circuitry (hardware) and software.

Figure 2:
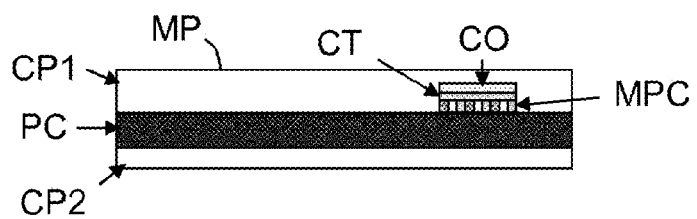
FIG. 2 is a schematic illustration of a transverse sectional view of an example of the physical medium comprising a pixel matrix defined with a printing system of the type illustrated in FIG. 1.

As illustrated in FIG. 2, the physical medium MP is here a card, which, once completed, but before it is finally personalised, comprises a substrate PC, which here constitutes a selected part in a zone Z on which the matrix MPC is to be printed, a first light-sensitive layer CT placed on top of the matrix MPC, a second light-sensitive layer CO placed on top of the first light-sensitive layer CT, a first protective layer CP1 placed on top of the substrate PC and the second light-sensitive layer CO and a second protective layer CP2 placed on top of the substrate PC. Alternative embodiments of that personalisable card MP may be envisaged by a person of the art, particularly those described in the patent document WO 2011/045180.

The first light-sensitive layer CT can be made at the same time as the second light-sensitive layer CO, and a person of the art will understand that the layers CT and CO can advantageously be grouped in a single layer inasmuch as the components that react to the different laser sources are compatible. Similarly, it is possible to use only one laser source to carry out two different types of personalisation in one and the same layer (for example white or black, using two different sets of parameters).

In the example that is described here in a non-limitative manner, the substrate PC is made of plastic material, such as for example PVC, ABS, a combination of PVC and ABS, PC, PET or PETG.

Besides, in this example, the first light-sensitive layer CT is opaque. It may for example be made of PMMA and designed to be modified selectively by modification means MA, which take the form of a second laser, for example using ultraviolet, in order to become transparent locally at predefined locations corresponding with selected pixels of the matrix MPC.

Further, in this example, the second light-sensitive layer CO is transparent. It may for example be made of carbon-doped polycarbonate (PC). Besides, it is designed to be modified selectively by the modification means MA, which take the form of a first laser (for example of the Nd-YAG or fibre type) in order to become locally opaque (different shades of grey) at predefined locations corresponding with selected pixels of the matrix MPC.

The invention mainly concerns the printing of the matrix MPC. To that end, it proposes to implement a printing method comprising at least one stage in a printing system SI of the type described above.

That stage consists in printing colour pixels in the zone Z (here of the substrate PC) of the card MP in at least one pass along oblique lines Lj (where j=1 to M+P−1) in relation to the physical medium MP, wherein the pixels of an oblique line Lj are all in the same colour selected from the N colours and different from that used for the previous oblique line L(j−1), in order to generate a matrix MPC of M (horizontal) lines comprising P pixels each in the N colours successively in a selected order, and wherein each (horizontal) line other than the first one comprises a first pixel that is identical to the second pixel of the previous (horizontal) line.

Figure 3:
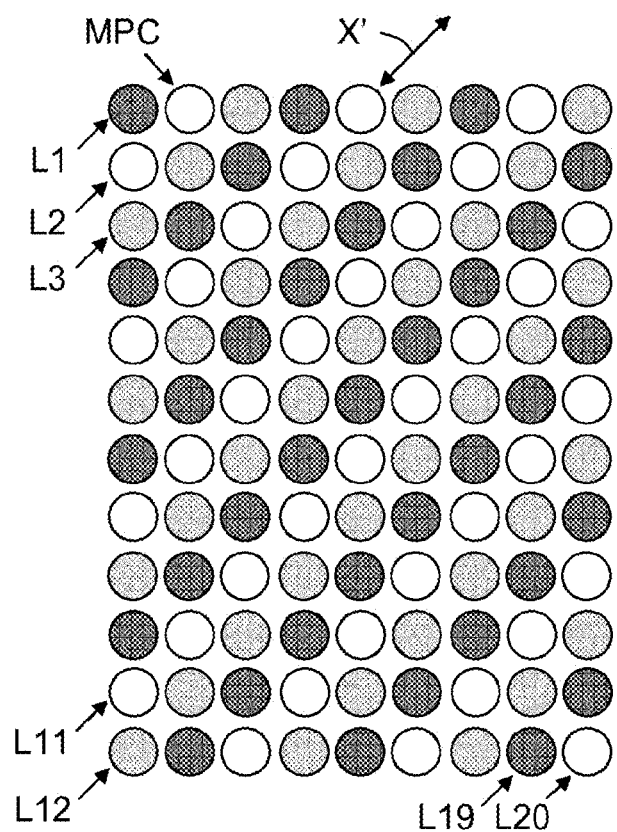
FIG. 3 is an illustration of an example of a pixel matrix obtained by 'oblique' movements of the first printing means in relation to an unturned physical medium.

FIG. 3 is a schematic illustration of a non-limitative example of an M*P matrix obtained without turning the card MP. In this example, N=3, M=12, P=9 and j=1 to 20. The order of printing of the three colours (primary colours here) of the pixels of each (horizontal) line is for example yellow (or J, here materialised in dark grey), magenta (or M, here materialised in white) and cyan (or C, here materialised in light grey).

For example, as illustrated in a non-limitative manner:
the colours of the 9 pixels of the $1^{st}$ (horizontal) line are J, M, C, J, M, C, J, M, C respectively,
the colours of the 9 pixels of the $2^{nd}$ (horizontal) line are M, C, J, M, C, J, M, C, J respectively,
the colours of the 9 pixels of the $3^{rd}$ (horizontal) line are C, J, M, C, J, M, C, J, M respectively and so on up to the $9^{th}$ (horizontal) line, where the colours of the 9 pixels are C, J, M, C, J, M, C, J, M respectively.

It is then verified that:
the $1^{st}$ oblique line L1 comprises only one yellow (J) pixel,
the $2^{nd}$ oblique line L2 comprises two magenta (M) pixels,
the $3^{rd}$ oblique line L3 comprises three cyan (C) pixels and so on up to the $20^{th}$ oblique line L20, which comprises only one magenta (M) pixel.

It can be understood that to generate this rectangular matrix MPC when the card MP is not turned, the printing means MI need to be moved along the oblique direction X' of the oblique lines Lj to generate pixels in the same colour of an oblique line Lj, then along a direction Y', perpendicular to direction X', to move to the next oblique line Lj' (where j'=j+1).

Figure 4:
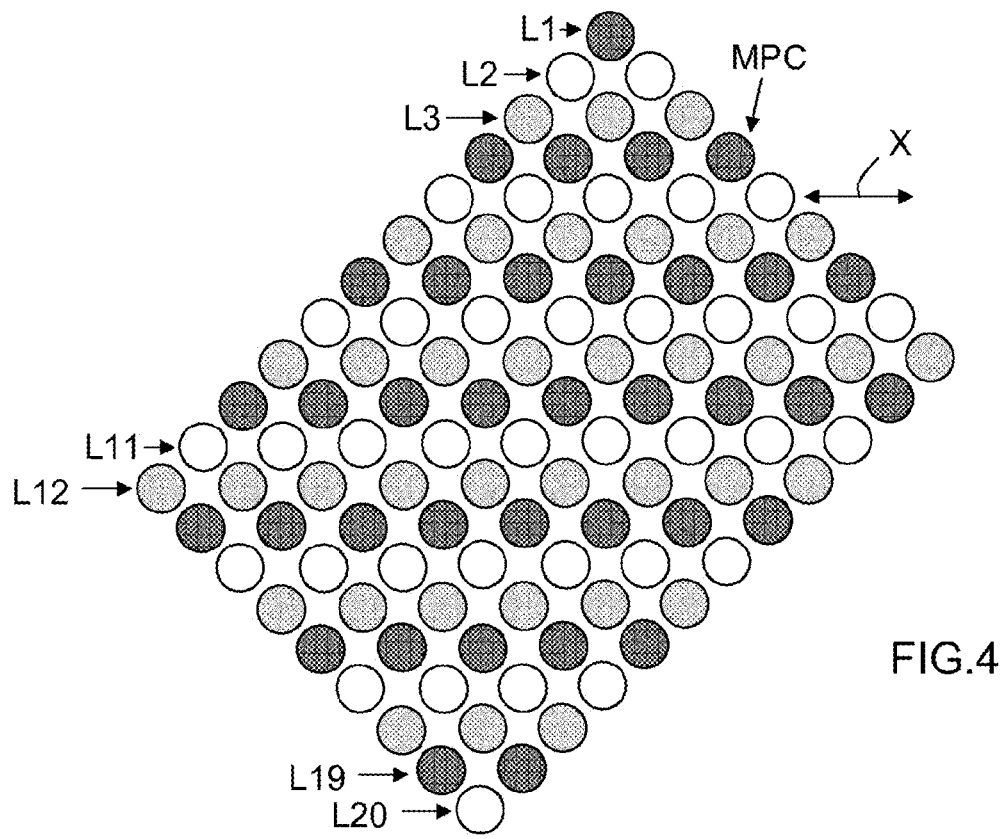
FIG. 4 is an illustration of an example of a pixel matrix obtained by 'horizontal' movements of the first printing means in relation to a turned physical medium.

In an alternative embodiment illustrated in FIG. 4 and corresponding with the printing system SI illustrated in FIG. 1, the rectangular matrix MPC can be generated after the card MP has been turned to a selected angle by rotating its supporting means MS (arrow F) over that selected angle during a preliminary stage of the method according to the invention. In that case, the printing means MI are displaced along the oblique direction X of the oblique lines Lj to generate pixels in the same colour of an oblique line Lj, then along a direction Y to move to the next oblique line Lj' (where j'=j+1).

For example, as illustrated in a non-limitative manner, the selected angle may be 45°.

Thanks to that mode of generation of the matrix MPC, one oblique line Lj' after another oblique line Lj, there is no risk that pixels in different colours belonging to neighbouring oblique lines can overlap, as any possible errors in the positioning of the pixels essentially occur along the oblique movement direction X (or X') and not along the direction of the horizontal lines. The result is the effective colour uniformity of pixels.

It must be noted that the movements of the printing means MI are controlled by the control device D by means of orders.

Figure 5:
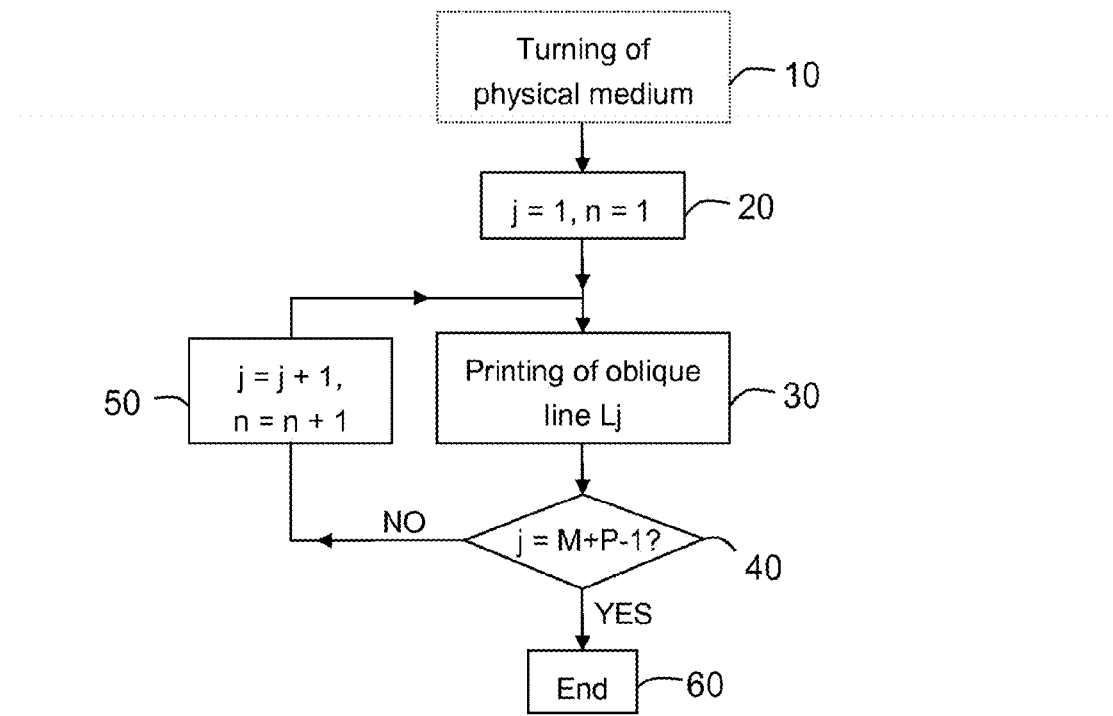
FIG. 5 is an illustration of an example of an algorithm that makes it possible to implement a pixel matrix printing method according to the invention in a printing system of the type illustrated in FIG. 1.

FIG. 5 is a non-(imitative illustration of an example of an algorithm that makes it possible to implement a method of printing a pixel matrix MPC according to the invention in a printing system SI of the type described above in FIG. 1.

That algorithm begins with a possible stage 10 during which the supporting means MS that support in a fixed manner the card MP are ordered to rotate (for example by the control device D) over the selected angle (for example) 45°

(arrow F) in order to turn the card over the selected angle (45°) in relation to the movement direction X of the printing means MI.

This algorithm continues with a stage 20 during which a first counter associated with the first variable j representing the oblique lines Lj is initialised (by the control device D), and also a second counter associated with the second variable n representing the N colours.

Then, the algorithm continues with a stage 30 during which the movement means are ordered (by the control device D) to position the printing means MI on the $1^{st}$ line L1 in order to print the single pixel of the line (L1) with the $1^{st}$ colour (n=1, yellow for example).

Then, the algorithm continues with a stage 40 during which a test is carried out (by the control device D) on the current value of the first variable j. If the current value of j is strictly below M+P−1, then, the first and second counters are incremented by a unit (by the control device D), then stage 30 is carried out again (by the control device D) in order to print the pixels of the $2^{nd}$ oblique line L2 with the $2^{nd}$ colour (for example magenta). Then, the test of stage 40 is carried out once again.

The stages 30 to 50 are thus repeated, every time with the incrementing of the values of the first and second counters by a unit till all the pixels of the last oblique line L(M+P−1) have been printed. In that case, the result of the test of stage 40 indicates that the current value of the first variable j is equal to M+P−1, and thus a final stage 60 is carried out (by the control device D), consisting in putting the printing means MI back in their initial idle position.

It must be noted that the second counter operates on a modulo N basis.

It must also be noted that in the example of an algorithm described above, the matrix MPC is printed one oblique line Lj after another oblique line Lj', and thus in several passes. But it can be printed in a smaller number of passes, for example by printing several lines of different colours at the same time. It can be understood that in that last hypothesis, the completion of the matrix MPC requires K passes, where K is defined by the whole part plus one unit of M divided by the number of oblique lines Lj printed by ink jet with each pass.

Besides, the person of the art will understand that the use of an ink jet printing system is not limitative.

It will also be noted that a method similar to that described for printing the matrix MPC may be used advantageously to modify the first CT and second CO light-sensitive layers when that is required for personalising a card MP. Specifically, when an exposure mask (or a galvanometric head algorithm) (generated from the digital data file that defines the image to be printed on the card MP) has been very accurately placed on top of the second light-sensitive layer CO of a card MP, the second laser of the modification means MA may be moved along the oblique direction X (or X') in order to expose the second light-sensitive layer CO and thus define the oblique lines of transparent pixels in correspondence with the pixels of the matrix MPC. Then, the first laser of the modification means MA may be moved along the oblique direction X (or X') in order to expose the first light-sensitive layer CT and thus define the oblique lines of pixels in grey shades selected in correspondence with the pixels of the matrix MPC. In the end, in the zone Z of the card MP, a reproduction of the image that must personalise the card MP is obtained.

Thanks to that mode of modification, one oblique line Lj' after another oblique line Lj, there is no risk that transparent or white pixels or pixels in different grey shades or black pixels belonging to neighbouring oblique lines can overlap randomly, as any possible errors in the positioning of the pixels essentially occur along the oblique direction X (or X') and not along the direction of horizontal lines. The result is more accurate superposing on the corresponding colour pixels of the matrix MPC and thus a significant decrease in local intensity and/or contrast and/or colorimetric errors in the image reproduced.

The invention claimed is:

1. A method for printing each pixel of a matrix of M*P pixels with a single colour amongst N colours, said N colours defining a colour coding system, on a selected part of a physical medium, said method further comprising laser personalization of said printed pixels in different shades of grey or black pixels or white pixels or transparent pixels in light-sensitive layers that are placed on top of said matrix of printed pixels, said method comprising a stage during which colours are printed in at least one pass along oblique lines of pixels in relation to said physical medium, wherein the pixels of an oblique line are all printed in the same colour selected from said N colours, different from that used for the previous oblique line, in order to generate a matrix of M horizontal lines comprising P pixels each in said N colours successively in a selected order, with the possible repetition of said order when P is greater than N, and wherein each horizontal line other than the first one comprises a first pixel that is identical to the second pixel of the previous horizontal line, whereby possible errors in the positioning of the pixels essentially occur along the oblique movement direction and not along the direction of the horizontal lines.

2. A method according to claim 1, wherein a preliminary stage is included wherein said physical medium is turned by a selected angle so as to make up the matrix (MPC) along oblique lines slanted to said selected angle, where all the pixels in each of them are in the same colour.

3. A method according to any of claims 1 or 2, wherein said printing is carried out using the ink jet process.

4. A method according to any of claims 1 or 2, wherein said printing is carried out using the offset printing process.

5. A method according to any of claims 1 to 4, wherein said colour coding system is selected from a group comprising at least the (Red, Blue, Green) system, the (Yellow, Magenta, Cyan) system and a combination of the two previous systems.

6. A device to control a printing system for printing a matrix of M*P pixels in N colours defining a colour coding system on a selected part of a physical medium, said device comprising
    printing system to print colours in at least one pass along oblique lines in relation to said physical medium, wherein the pixels of an oblique line are all in the same colour selected from said N colours, different from that used for the previous oblique line, in order to generate a matrix of M horizontal lines comprising P pixels each in said N colours successively in a selected order, with the possible repetition of that order when P is greater than N, and wherein each horizontal line other than the first one comprises a first pixel that is identical to the second pixel of the previous horizontal line, and
    modifying means organized to carry out laser printing of pixels in different shades of grey or black pixels or white pixels or transparent pixels in light-sensitive layers of said physical medium that are placed on top of said matrix, corresponding with said colour pixels of said matrix respectively.

7. A printing system for printing a pixel diagram in N colours defining a colour coding system on a selected part of a physical medium, comprising:
    a device according to claim 6.

8. A printing system according to claim 7, further comprising supporting means capable of receiving said physical medium in a position turned by a selected angle so that said matrix is made up along oblique lines slanted by that selected angle, and where all the pixels in each of them are in the same colour.

9. A system according to any of claims 7, comprising printing means organised to carry out said ink jet printing.

10. A system according to any of claims 7 or 8, comprising printing means organised to carry out said offset printing.

11. A system according to any of claims 7 to 10, wherein said colour coding system is selected from a group comprising at least the (Red, Blue, Green) system, the (Yellow, Magenta, Cyan) system and a combination of the two previous systems.

* * * * *